United States Patent Office 2,861,918
Patented Nov. 25, 1958

2,861,918
AMINE SALTS

Milton Kosmin, Dayton, Ohio, assignor to Monsanto Chemical Company, St. Louis, Mo., a corporation of Delaware No Drawing. Application October 16, 1956
Serial No. 616,139

6 Claims. (Cl. 167—33)

The present invention relates to amine salts and more particularly provides certain new and valuable polyamine salts, methods of preparing the same, and fungicidal compositions comprising said salts.

According to the invention the new salts are provided by the condensation of (2-benzothiazolylmercapto)-alkanoic acids with N-hydrocarbon polyalkylenepolyamines substantially according to the scheme:

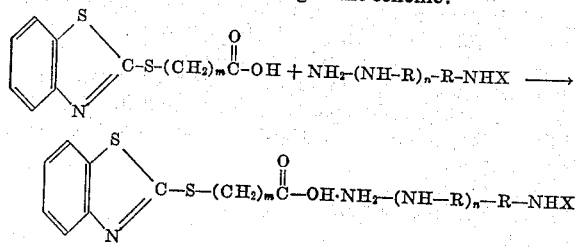

in which $m$ is an integer of from 1 to 3, R is an alkylene radical of from 2 to 3 carbon atoms, $n$ is an integer of 0 to 2 and X is an aliphatic hydrocarbon radical of from 8 to 18 carbon atoms.

(2-benzothiazolylmercapto)alkanoic acids useful for the present purpose include: 2-benzothiazolylmercapto-acetic acid, 2-(2-benzothiazolylmercapto)propionic acid and 3-(2-benzothiazolylmercapto)butyric acid.

As examples of amines which are reacted with the (2-benzothiazolyl)mercaptoalkanoic acids according to the invention to give the present salts may be mentioned the following: N-octyldiethylenetriamine, N - decyltri-propylenetetramine, N-n-dodecyltriethylenetetramine, N-branched chain tetradecyldipropylenetriamine, N-hexa-decyldiethylenetriamine, N - octadecylpropylenediamine, N - nonylethylenediamine, N - (2 - ethylhexyl)ethylenediamine, N - (2-n-propylheptyl)dipropylenetriamine, N - (2,6,8 - trimethylnonyl)diethylenetriamine, N - keryltri - ethylenetetramine (where keryl denotes the mixture of alkyl radicals corresponding to the hydrocarbons of kerosene), N-octenylpropylenediamine, N-decenyldiethylene-triamine, N-hexadecenyldiethylenetriamine, N-octadecen-ylethylenediamine, N - tetrapropenyldiethylenetriamine (prepared by the addition reaction of diethylenetriamine with the reaction product of propylene tetramer and hypochlorous acid or chlorine), etc.

The present amine salts are well defined liquid to waxy or even crystalline compounds which are generally soluble in water and the lower alkanols. As will be shown hereinafter the present amine salts are characterized by high fungitoxicity properties. This effect is demonstrated when they are present in treating solutions in very small concentrations, e. g., in quantities of as low as say from 10 to 200 parts per million.

Conversion of the (2-benzothiazolyl)mercaptoalkanoic acids into the present amine salts is effected by simply adding the amine to the acid in the presence or absence of an inert diluent and allowing the resulting mixture to stand until the acid has been converted into the salt. The diluent or solvent, if one were used, may then be removed by distillation or by extracting the salt with water. Depending upon the ultimate use of the salt, it is often unnecessary to separate the solvent, the crude reaction mixture being useful directly in applications where the presence of a diluent may be immaterial. Inert diluents or solvents useful in preparing the present amine salts are the lower aliphatic alcohols, e. g., ethanol and isopropanol, hydrocarbons such as benzene, kerosene, and hexane, etc.

Since formation of the salts occurs by addition of 1 mole of the N-hydrocarbon polyalkylenepolyamine to 1 mole of the (2-benzothiazolylmercapto)alkanoic acid, stoichiometric proportions of the acid and the amine are advantageously employed. However, an excess of either reactant may be employed since any unreacted amine or acid may be readily recovered from the reaction product.

The invention is further illustrated but not limited by the following examples:

Example 1

This example shows preparation of a N-dodecyldiethyl-enetriamine salt of (2-benzothiazolylmercapto)acetic acid. The dodecyl substituted amine used was a N-keryl-diethylenetriamine which had been obtained by condensing with diethylenetriamine a substantially mono-chlorinated kerosene fraction (57.4% chlorinated on a molar basis, and prepared from an unchlorinated kerosene fraction boiling at about 150–250° C.).

22.5 g. (0.1 mole) of the (2-benzothiazolylmercapto) acetic acid was mixed with 28.3 g. (0.1 mole, based on the keryl radical as $C_{12}$) of the N-keryldiethylenetriamine. The resulting mixture was then dissolved in 100 ml. of ethanol. After removing the solvent by vacuum distillation there was obtained as residue a viscous liquid which comprised the substantially pure N-keryldiethylenetri-amine salt of 2-(benzothiazolylmercapto)acetic acid. The salt was soluble in ethanol and in acetone.

Example 2

This example shows fungistat testing of the N-keryl-diethylenetriamine salt of 2-(benzothiazolylmercapto)- acetic acid which was prepared in Example 1 against the organisms *Stemphylium sarcinaeforme* and *Monilinia fructicola*. Respective suspensions of the organisms were prepared from 5-day old cultures thereof on slants of agar cultures by removing said spores with a rubber policeman from the slant and suspending them in distilled water. The concentration of spores was adjusted to about 40,000 per ml. of water.

A 1.0% acetone solution of (2-benzothiazolylmercapto) acetate of Example 1 was added to water in a concentration calculated to give 1,000 parts of the salt per million parts of water. An 0.02 ml. aliquot of the resulting solution was pipetted into wells of two depressed glass slides and allowed to evaporate to dryness. Then a 0.1 ml. aliquot of each of the above spore suspensions was respectively pipetted into each well. The concentration of said salt in each well was thus lowered to 200 parts per million parts of diluent. Two "blanks" were also prepared by pipetting respectively 0.1 ml. aliquots of the above spore suspensions into empty wells of two depressed glass slides. All of the slides were then incubated in a moist chamber for 16 hours at 25° C. Inspection of the slides at the end of this time showed no germination of either the *Stemphylium sarcinaeforme* or *Monilinia fructicola* spores in the presence of the salt, i. e., on the slides on which the N-keryldiethylenetriamine salt of (2-benzothiazolylmercapto)acetic acid had been deposited; whereas there was profuse spore germination on the "blanks."

Example 3

This example shows evaluation of the (2-benzothiazolylmercapto)acetic acid salt of Example 1 as a systemic fungicide in the control of tomato wilt.

Three two-week old Bonny Best tomato seedlings were immersed into water containing 10 parts per million of the test compound. After 48 hours the seedlings were removed and the root systems were rinsed thoroughly in tap water to remove any chemical residue. Approximately ⅓ of each lateral root system of each plant was severed and the wounded roots were dipped for 30 seconds in a bud-cell suspension of *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the salt. The potted plants were then set in the greenhouse for observation.

Marked Fusarium wilt symptoms were noted on the "blanks;" whereas the plants which had been treated with amine salt appeared to be in excellent condition. At this time disease incidence in the plants which had been immersed in the N-keryldiethylenetriamine salt of (2-benzothiazolylmercapto)acetic acid was investigated by cross-sectioning the stem of each of the treated and inoculated plants and examining them for vascular browning. No vascular discoloration was noted. Similar examination of the "blanks" showed pronounced browning.

Example 4

This example shows evaluation of the N-keryldiethylenetriamine salt of (2-benzothiazolylmercapto)acetic acid as a foliage protectant.

An aliquot of a 1.0 percent acetone solution of the salt was pipetted into the vial of an atomizer, there was then added 0.1 ml. of a dispersing agent known to the trade as "Tween 20" (a polyoxyalkylene derivative of sorbitan monolaurate), and the volume of liquid was brought up to 10 ml. by addition of water.

Cucumber plants (Green Prolific) with the first leaf the size of a 50-cent piece were sprayed to run-off with the atomizer, which delivered 10 ml./45 sec. at 10 p. s. i. per each plant. This corresponded to the use of a spray containing 1250 parts of the salt per million parts of carrier (equivalent to one pound of the salt per 100 gallons of spray). The sprayed plants were then placed on the greenhouse bench and the spray which had been deposited thereon was allowed to dry. They were then placed in a moist chamber (100% humidity) at 70° F. and inoculated by spraying with a spore suspension of *Colletotrichum lagenarium*, the causal agent of cucumber anthracnose. The suspension employed contained 30,000 to 60,000 spores per ml.

After 36 hours in the moist chamber the plants were moved to a greenhouse bench and kept there for five days. Observation of the plants at the end of that time was made by examining the leaves of the plants for lesions. No lesions had occurred on the plants which had been sprayed and inoculated as herein described. On the other hand control tests in which the cucumber plants had not been sprayed with the present salt showed severe infection after being similarly inoculated with the *Colletotrichum lagenarium*.

Salts of (2-benzothiazolylmercapto)acetic acid or of other (2-benzothiazolylmercapto)alkanoic acids with the present N-hydrocarbon polyalkylenepolyamines are generally efficient against fungi. The salt of (2-benzothiazolylmercapto)acetic acid and N-(tetrapropylene)diethylenetriamine or the salt of 2-(2-benzothiazolylmercapto)-propionic acid and N-n-dodecyl, N-hexadecyl or N-octyl-triethylenetetramine possess pronounced fungistatic effect. As herein disclosed said salts are readily obtainable by simply mixing the (2-benzothiazolylmercapto)alkanoic acid with the appropriate N-alkylpolyalkylenepolyamine in the presence or absence of an inert diluent.

The present salts are highly efficient for preventing or retarding fungus growth on plants, fruits, seeds, soils, furs, leather, cotton, wood and organic material in general. They may be applied directly to the organic material which is to be treated, but because the salts are effective in extremely dilute concentrations, it is preferred to incorporate them with a carrier or a diluent. Solutions of the salts may be employed in the absence of any dispersant; however, for many purposes the addition of a dispersing agent is preferred in that better adhesion or penetration of the treating solution is obtained. As dispersing agents there may be used e. g., alkali metal salts of higher alkyl sulfosuccinates, the higher alkylbenzenesulfonates, polyalkylene glycol ethers of long chained alcohols, etc.

Fungistatic or fungicidal dusts may be prepared by mixing the present salts with dusting materials such as talc, clay, lime, bentonite, pumice, fuller's earth, etc.

Compositions comprising the present N-hydrocarbon polyalkylenepolyamine salts of (2-benzothiazolylmercapto)alkanoic acids may be applied only to the surface of the material to be protected against fungi as when treating foliage, furs, leather and other comparatively impregnable material upon which fungus growth is to be prevented or retarded. In other cases, for example, when it is desired to protect seeds from soil microorganisms harmful to the seeds and plants, the present salts, preferably incorporated with a solid carrier, may be mixed with the seed. Impregnation of textiles with the salts is advantageously effected by immersion in solutions of these compounds in the presence or absence of a wetting-out agent.

What I claim is:

1. A salt of the formula

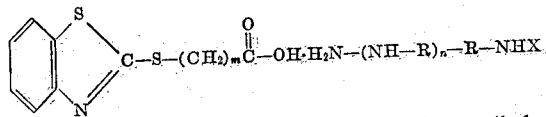

in which $m$ is an integer of from 1 to 3, R is an alkylene radical of from 2 to 3 carbon atoms, $n$ is an integer of 0 to 2 and X is an aliphatic hydrocarbon radical of from 8 to 18 carbon atoms.

2. The N-keryldiethylenetriamine salt of 2-benzothiazolylmercapto)acetic acid, said keryl radical denoting the mixture of alkyl radicals corresponding to the hydrocarbons of kerosene.

3. A composition effective against fungi which comprises an inert carrier and as the essential effective ingredient a salt of the formula

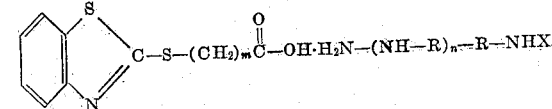

in which $m$ is an integer of from 1 to 3, R is an alkylene radical of from 2 to 3 carbon atoms, $n$ is an integer of 0 to 2 and X is an aliphatic hydrocarbon radical of from 8 to 18 carbon atoms.

4. A composition effective against fungi which comprises an inert carrier and as the essential effective ingredient the salt of (2-benzothiazolylmercapto)acetic acid and N-keryldiethylenetriamine wherein the keryl radical denotes a mixture of alkyl radicals corresponding to the hydrocarbons of kerosene.

5. The method of combatting fungi which comprises exposing said fungi to a toxic quantity of a salt of the formula

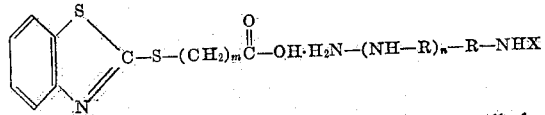

in which $m$ is an integer of from 1 to 3, R is an alkylene radical of from 2 to 3 carbon atoms, $n$ is an integer of 0 to 2 and X is an aliphatic hydrocarbon radical of from 8 to 18 carbon atoms.

6. The method of combatting fungi which comprises exposing said fungi to a toxic quantity of the salt of (2-benzothiazolylmercapto)acetic acid and N-keryldiethylenetriamine wherein the keryl radical denotes the mixture of alkyl radicals corresponding to the hydrocarbons of kerosene.

References Cited in the file of this patent
UNITED STATES PATENTS 2,158,021    Lichty _____ May 9, 1939